United States Patent [19]
Tamblyn

[11] Patent Number: 5,275,333
[45] Date of Patent: Jan. 4, 1994

[54] AIR CONDITIONING SYSTEM PROVIDING FOR INDIVIDUAL WORK STATION CONTROL

[76] Inventor: Robert T. Tamblyn, 12 Littlebrook Court, Thornbill, Canada, L3T 7J6

[21] Appl. No.: 753,382

[22] Filed: Aug. 30, 1991

[51] Int. Cl.⁵ .............................. G05D 23/00
[52] U.S. Cl. ....................... 236/51; 137/554; 454/322
[58] Field of Search ............ 236/51, 49.3, 94; 454/322, 239; 137/554; 251/129.04

[56] References Cited

U.S. PATENT DOCUMENTS 2,900,918  8/1959  Thomas et al. ............ 137/554 X
4,969,508  11/1990  Tate et al. ............... 236/49.3 X

FOREIGN PATENT DOCUMENTS 761792   6/1967  Canada.
952760   8/1974  Canada.
1053062  4/1979  Canada.
1071005  2/1980  Canada.
1273524  9/1990  Canada.
0244229  9/1989  Japan ....................... 236/51
0075438  3/1991  Japan ....................... 236/94

OTHER PUBLICATIONS

Space Pak by Hydro Therm Inc.–Sales Brochure 1990.

*Primary Examiner*—William E. Wayner
*Attorney, Agent, or Firm*—Charles P. Boukus, Jr.

[57] ABSTRACT

Disclosed is an air conditioning system which provides for controlling the flow of conditioned air from a duct to a predetermined location of an occupied area of a building. A fitting is secured at one end thereof to the duct and has a moveable butterfly valve mounted therein for selectively controlling flow of conditioned air therethrough, the fitting including a motor and motor control relay for controlling operation of the valve. An outlet is mounted in association with wall means adjacent the location and spaced from the fitting. A flexible conduit is connected to another end of the fitting means and extends from the fitting means to and is connected with the outlet means. A remote signal receiver is in electrical circuit with the motor means and motor control relay and is located to receive a transmitted signal and there is a remote controlled signal transmitter signal compatible with the receiver whereby an occupant in the location may remotely control through actuation of the transmitter, the position of the valve in the fitting means and thus control the flow of conditioned air through the outlet means to the location.

6 Claims, 6 Drawing Sheets

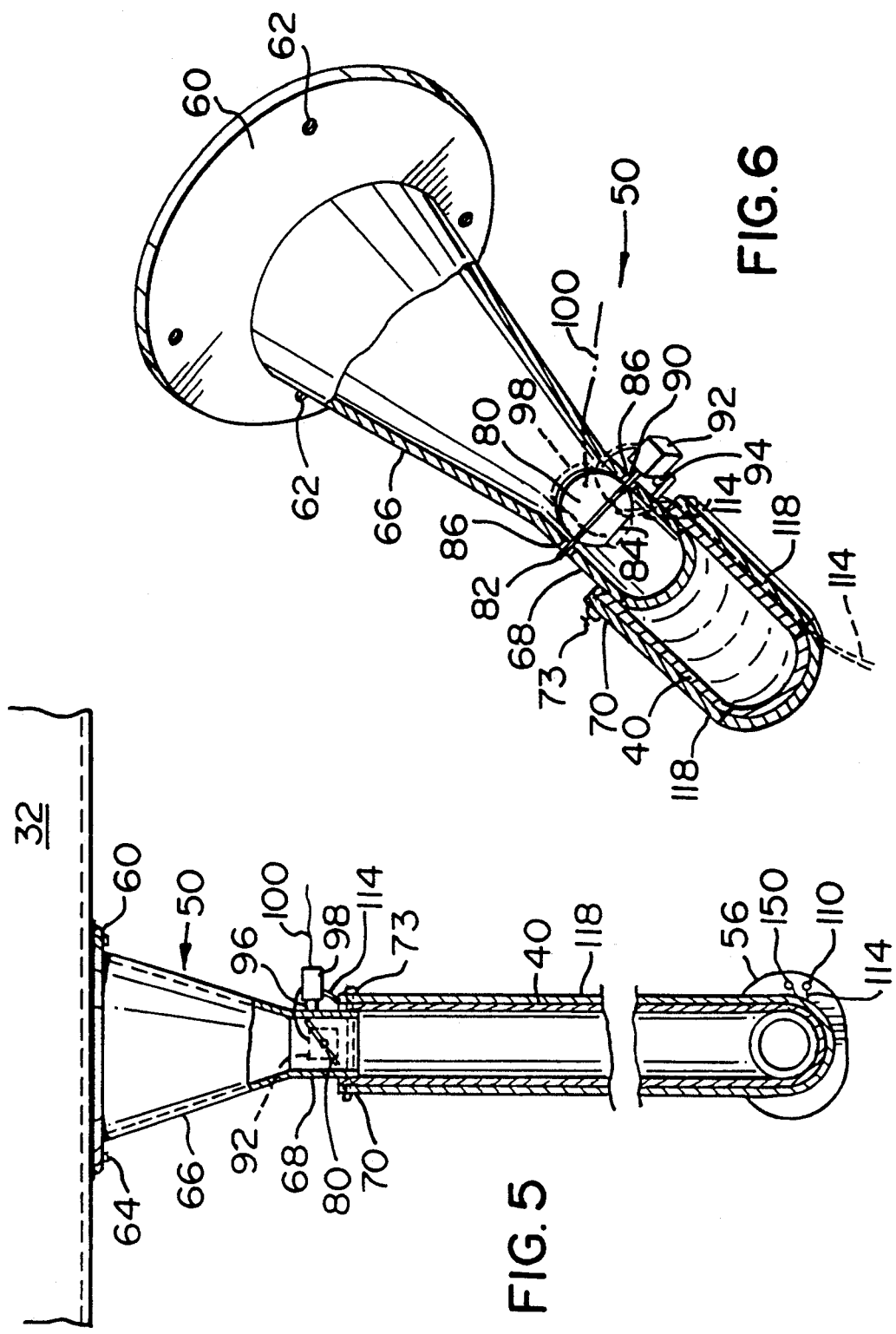

AIR CONDITIONING SYSTEM PROVIDING FOR INDIVIDUAL WORK STATION CONTROL

FIELD OF THE INVENTION

The present invention relates to a system for air conditioning occupied areas and more particularly relates to providing an enhanced air conditioning system wherein a degree of individual control of the distribution of air to individual areas or work stations is possible.

BACKGROUND OF THE INVENTION

Air conditioning systems generally have provided an overall controlled climate within a building or on various floors in a building by providing conditioned air to an area and withdrawing air from the area for return to an air conditioning unit. Fresh air is introduced under controlled conditions as part of the conditioned air.

With the advent of computers, very sophisticated computer controlled systems are now possible and particularly in large, high rise buildings.

However, the sophistication of the system and the attempt at uniform control often detracts from the comfort of the individuals on the various floors of a building and within zones or areas on those floors. It is now acknowledged that few people perceive the effectiveness of an air conditioning system the same, some preferring a cooler environment in which to work, others a slightly warmer climate.

Accordingly, there is a desire to improve the general acceptance of air conditioning systems by evolving a system which offers many occupants of a zone a measure or degree of individual control over the movement of conditioned air in that zone.

There is commercially available a system by Hydro Therm under the trade mark SPACE PAK TM which is often used to provide central air conditioning for older homes or small buildings, particularly those which do not have forced air heating systems. The SPACE PAK TM system locates a blower coil unit in the attic, for example, and provides an insulated plenum in communication with the blower coil unit and from which plenum flexible pre-insulated tubing extends to each room of the house. The flexible tubing may be threaded from floor to floor through closets, between wall studs, or between floor or ceiling joists. Constant volume conditioned air is delivered to air outlets installed in each room of the house in the ceiling, walls or floors.

With houses and small buildings, the SPACE PAK TM system is relatively small and individual control of the air distribution is not considered necessary or desirable as a cost effective system.

Canadian patent No. 1,071,005 of Schmidt et al granted Feb. 3, 1980, relates to a method and apparatus for ventilation or air conditioning occupied rooms and more particularly to a system providing within an occupied room, small zones where thermal conditions are individually adjusted in such fashion that the motion of air may be regulated. This is over and above general room temperature control. The Schmidt et al system provides a primary air climate control system with low velocity air as well as a secondary system, the secondary system providing individual manually controlled adjustable air outlets. These outlets, as part of the secondary system, provide in each of the constantly occupied spaces a "local" climate zone which is distinct from the basic primary climate control conditions. Schmidt et al provides adjustable nozzles at the ends of riser tubes or stanchions to provide the supplemental secondary air to individual work stations or local zones.

The Schmidt et al system has not proven satisfactory in that the only control of supplemental air flow is manual adjustment of nozzles on riser tubes or stanchions. The riser tubes or stanchions are unsightly and can interfere with movement of furniture and people within the areas or zones.

Accordingly there is a need to provide a system which permits a degree of individual control of the flow of air at various locations within particular areas and zones and which will provide at least a perception of cooler conditions within the area or zone due to the movement of air directed to that area or zone.

SUMMARY OF THE INVENTION

The invention seeks to provide an air conditioning system which permits a degree of individual remote control of air conditioning in a zone within a larger area.

Briefly the invention seeks to provide apparatus for use within such air conditioning system and more particularly provides a fitting having a motorized valve for controlling the flow of air to a selected location in the zone. The valve is controlled by remote control through a transmitter and sensor system such as one that utilizes infrared wavelength transmission. A sensor is located in or is associated with an escutcheon plate of a ceiling or wall outlet and is wired to a motor controlling the valve, the valve being in a fitting take-off from a conditioned air branch duct. A controller which includes a transmitter is portable and when an occupant actuates the controller, a signal is transmitted to the sensor, the operator can open or close the valve to control the flow of conditioned air to the zone. Although the controller is portable, it can be located in the zone and may include a temperature sensor to automatically control the valve and thus the flow of conditioned air to the zone.

Accordingly, the invention in one aspect provides means for remotely controlling the flow of conditioned air in an air conditioned system from a duct to a predetermined location of an occupied area of a building. A fitting is secured at one end thereof to the duct and has a moveable butterfly valve mounted therein for selectively controlling flow of conditioned air therethrough, the fitting including a motor and motor control relay for controlling operation of the valve. An outlet is mounted in association with wall means adjacent the location and is spaced from the fitting. A flexible conduit is connected to another end of the fitting and extends from the fitting to and is connected with the outlet. A remote signal receiver is in electrical circuit with the motor and motor control relay and located to receive a transmitted signal and a remote controlled signal transmitter which is signal compatible with the receiver, is provided, whereby an occupant in the location may remotely control through actuation of the transmitter, the position of the valve in the fitting and thus control the flow of conditioned air through the outlet to the location.

The invention also pertains to a method of air conditioning a work area on a floor wherein there is a duct system for conveying conditioned air to the floor and a fitting secured to the duct having a motor controlled valve, the fitting being in air flow communication through a flexible condition to an outlet spaced from the fitting and associated with a wall or ceiling adjacent the work area. The method includes providing signal receiving means mounted in electrical circuit with control means for the motor controlled valve, providing signal transmitter means remote from the outlet and in the work area and selectively activating the transmitter to send a signal compatible with the receiver to control the positions of the valve in the fitting and the flow of air through the outlet to the work area.

Still further, the invention provides a fitting for use in an air conditioning system for controlling the flow of conditioned air from a duct to a remotely located outlet adjacent a selected work station associated with a room. The fitting has means at one end to secure it in flow communication with a duct and a butterfly valve mounted for rotation within the other end of the fitting spaced from the securement means. The fitting has a conical section between said securement means and the other end and a motor is mounted to the fitting other end for controlling the position of the valve and the valve having a flat section which cooperates with adjacent walls of the fitting other end to permit a minimum flow of conditioned air to pass when the valve is in the closed position.

Still further, the invention comprehends an outlet in an air conditioning system for conveying conditioned air to an occupied area, comprising an escutcheon plate having an opening therein and a hollow annular portion extending generally perpendicularly to the plane of the plate and associated with the opening. The outlet includes a signal receiver mounted to the escutcheon plate and there are wires associated with the receiver for operative electrical connection to a valve or the like remote from the outlet when in use which controls the flow of air conveyed through the outlet.

Other aspects and features of the invention will become evident from the description of a preferred embodiment herein.

BRIEF DESCRIPTION OF THE DRAWINGS

FIG. 5 is a plan view from above and partly in section of the variable volume zone, flexible tubing and outlet.

FIG. 6 shows a perspective view partly in section of the valve fitting.

DESCRIPTION OF THE PREFERRED EMBODIMENT

Figure 1:
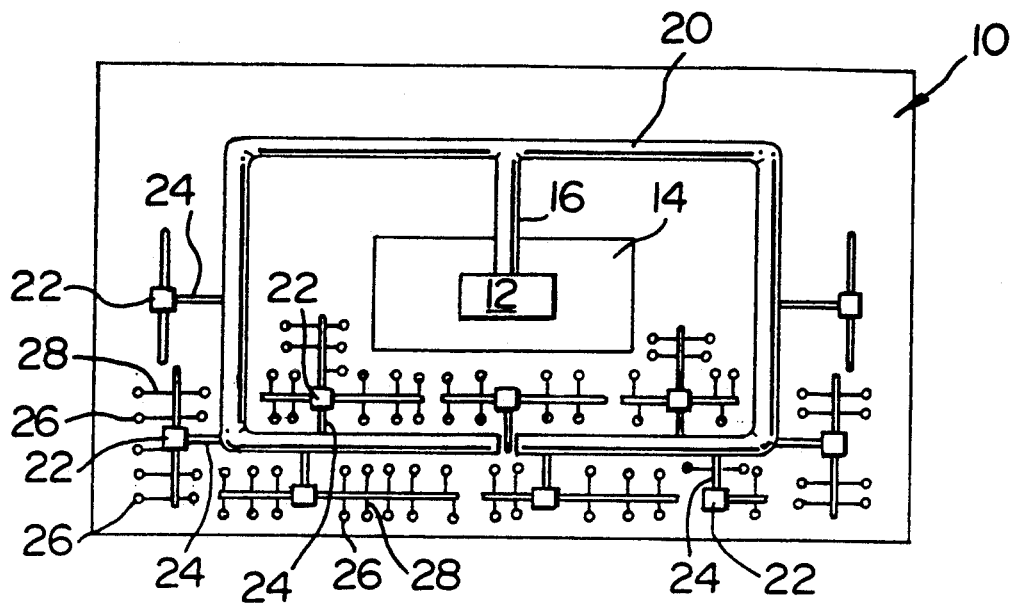
FIG. 1 is a plan view of a typical building section showing a conventional conditioned air duct distribution system for a floor.

Turning to the drawings, FIG. 1 schematically illustrates in plan view a typical, known duct layout for building floor 10 having blower unit 12 capable of feeding conditioned air to all parts of the floor 10. Blower unit 12 may include cooling coil means (not shown) and means for introducing fresh air conducted to the floor (also not shown). However, the invention is not concerned with the means of cooling the air or providing fresh air as part of the conditioned air but rather the distribution of the air from the unit 12. Accordingly, further details of unit 12 or how fresh air is brought into the unit 12 is not considered necessary herein.

Unit 12 is located usually in a centralized area adjacent zone 14, which zone may include elevator shafts, washrooms, maintenance rooms and lobby areas (none of which are shown). Blower unit 12 feeds ring main 20 via conduit 16, which duct 20 in turn feeds variable volume boxes 22 through ducts 24. Boxes 22 feed individual air outlet devices 26 through feeder ducts 28. Through control of the variable volume boxes 22, the cooling condition of various areas or zones on floor 10 may be controlled and adjusted, usually by thermostat control, all of which is well known in the art.

Figure 2:
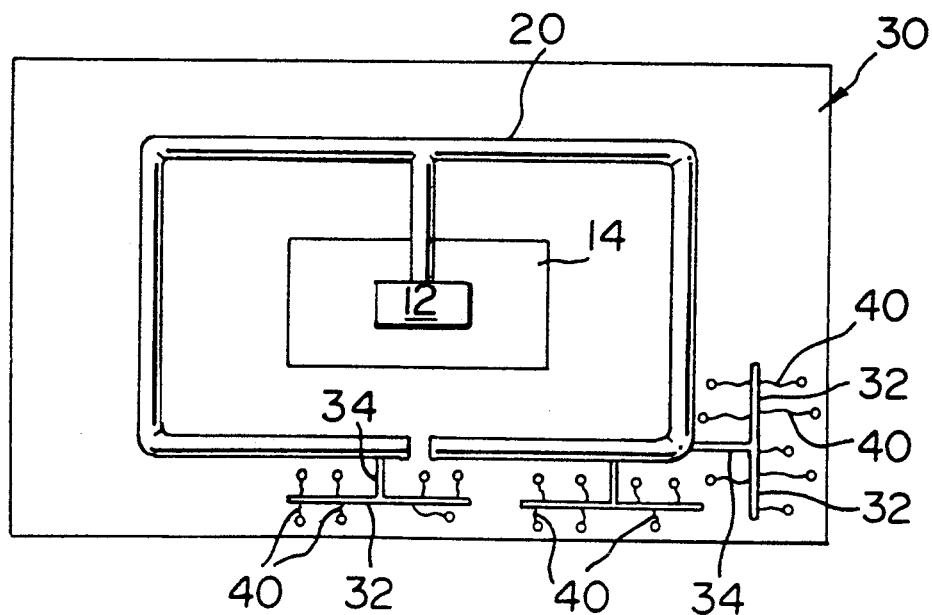
FIG. 2 is a plan view of a building section showing a duct system for distributing conditioned air to various areas and including the variable controlled devices of the invention.

FIG. 2 illustrates a modified duct system for floor 30 as a result of the invention herein wherein blower unit 12 and ring main 20 are the same as in FIG. 1. However, trunk ducts 32 are fed conditioned air from ring main duct 20 through branch ducts 34 and trunk ducts 32 feed a plurality of flexible insulated conduits 40 with conditioned air as more particularly set forth herein. There are no variable control boxes 22 in the embodiment of FIG. 2.

Figure 3:
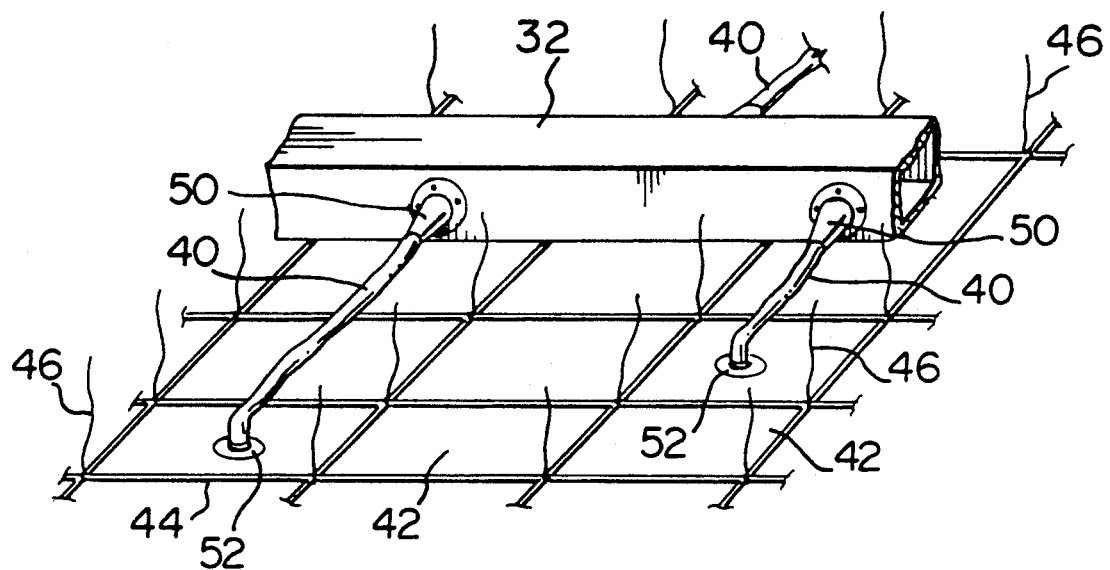
FIG. 3 is a partial perspective view from above of a part of the system taken in the direction of lines 3—3 of FIG. 2.
Figure 4:
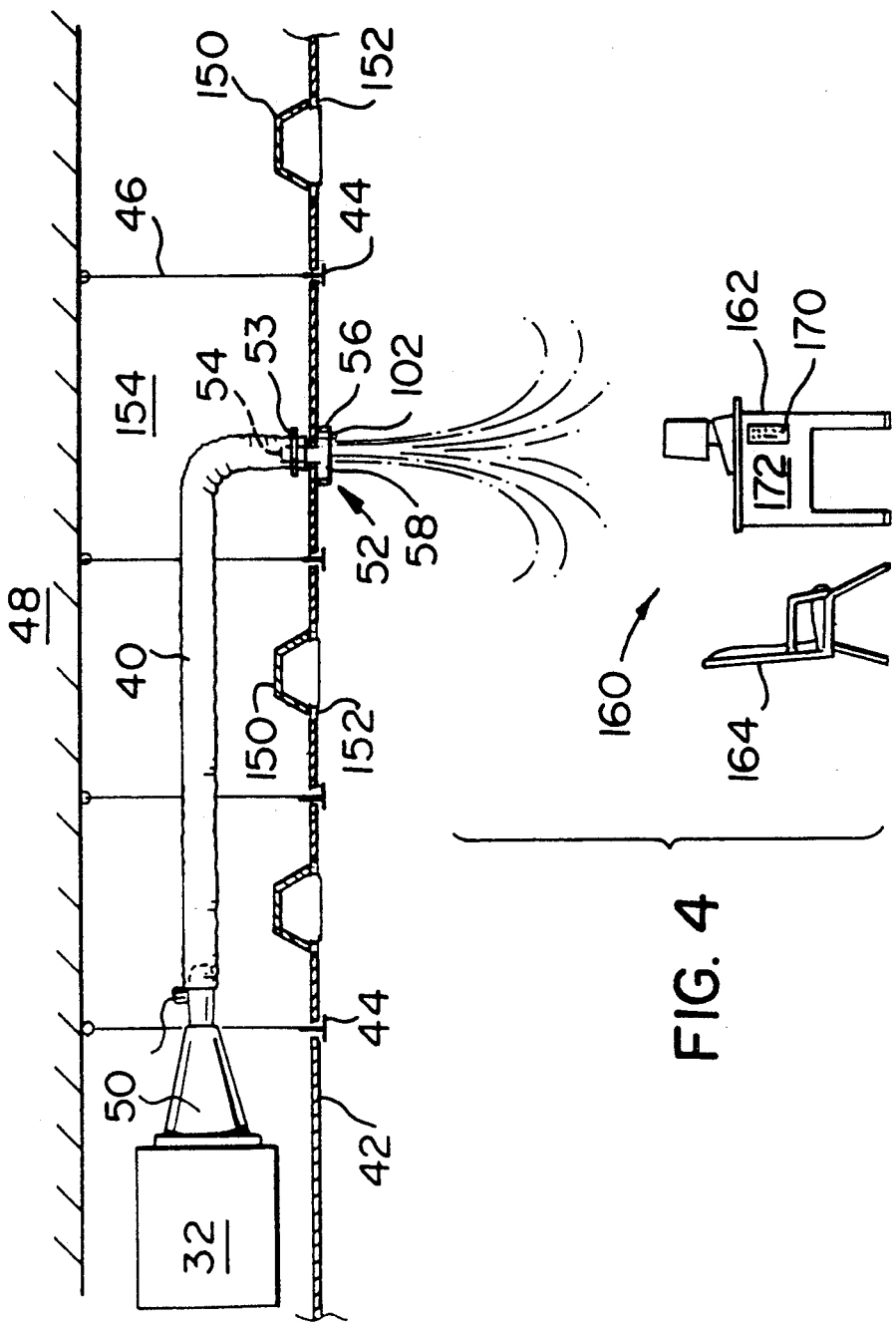
FIG. 4 is an enlarged elevational view of the variable volume zone flexible tubing and outlet at a zone or work station.

FIGS. 3 and 4 illustrate in perspective view and side view respectively, a trunk duct 32 and flexible conduits 40 above false ceiling tiles 42 which are supported in known manner by T-bars 44 and hangers 46 connected to the building floor 48 thereabove (see FIG. 4). As further shown in FIGS. 3, 4 and 5, each flexible conduit 40 is connected through fitting 50 to rectangular trunk duct 32 and extends to an air outlet 52 and connected with cylindrical portion 54 of outlet 52 by clamp 53 as more fully set forth herein. Escutcheon plate 56 of outlet 52 has outer face 58 acting, when installed against ceiling tiles 42, as an appearance plate (see also FIGS. 7-9).

More particularly, as shown in FIGS. 5 and 6, fitting 50 has flange 60 with screw holes 62 for securement to a branch duct 34 by screws 64. It will be apparent that other forms of securement between flange 60 and duct 32 are possible, including known twist-lock systems for connecting ducts in air conditioning and ventilation systems. Fitting 50 has cone section 66 and cylindrical end 68, end 68 being adapted to permit end 70 of insulated flexible duct 40 to be secured thereto by circular clamp 73. It will be appreciated that any form of means of securing connection between duct end 70 and fitting end 68 is possible as with securing connection between duct end 41 and outlet portion 54. Butterfly valve 80 is supported within fitting end 68 by shaft 82 and is supported for rotary movement from an open position to a closed position. Valve 80 has a flat section 84 which allows some air to pass valve 80 even in its fully closed position. Subject to the minimum volume of air passing due to flat section 84, generally the volume of air through flexible conduit 40 is controlled by valve 80.

Shaft 82 is supported by suitable bearings 86 secured within fitting end 68. An end 90 of shaft 82 is connected to small electric motor 92 which is supported by fitting end 68 through bracket 94. Also supported by fitting end 68 through suitable bracket 96 is motor relay control 98 supplied electrical power through a 24 volt line 100. As is well known in the art, there is usually a 24 volt power line available in buildings for operating various motorized controls associated with the operation of heating and ventilation systems. As an alternative, motor control could be operated by long life batteries.

Figures 8, 9:
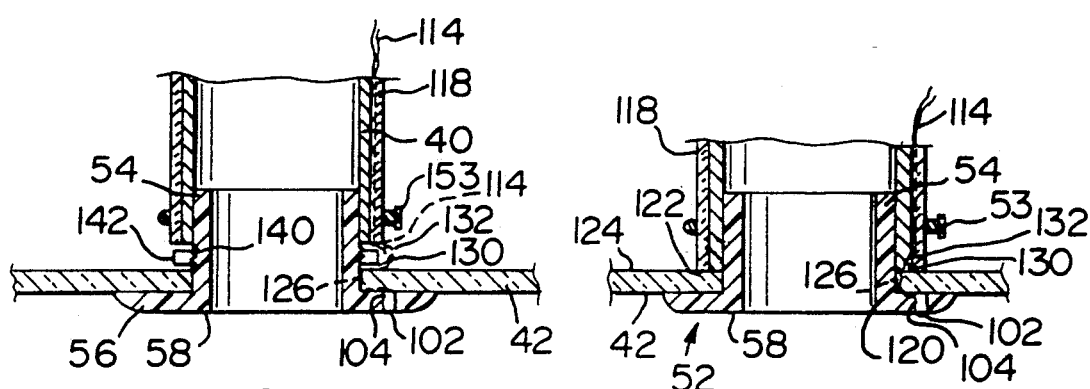
FIG. 8 shows a sectional view of the outlet of FIG. 7 taken along lines 8—8 of FIG. 7.
FIG. 9 shows a sectional view of a modified outlet.

Turning to FIG. 8, an enlarged cross-sectional view of outlet 52 is shown with escutcheon plate 56 facing ceiling tile 42.

Escutcheon plate 56 has infrared sensor 102 secured in aperture 104 and has at least one LED 106 secured in aperture 108, sensor 102 and LED 106 being operatively wired to motor control 98 through wires 114. Wires 114 preferably run along the flexible conduit 40 between the periphery of the metal conduit and insulation 118. Wires 114 and insulation 118 are preassembled to conduit 40 before use and installation thereof.

Plate 56 faces tile 42 about tile aperture 120, aperture 120 being sized to closely accept cylindrical portion 54 of outlet 52. End 122 of insulated conduit 40 is held against back 124 of tile 42 when circular clamp 53 secures conduit end 122 to cylindrical portion 54. Clamp 53 is of the known circular type of the pipe clamp although any adjustable circular clamp will suffice. Outlet 52 has sensor 102 and LED 106 already installed with wires 126 having known female - male clip means 130 for operative association with clips 132 of wires 114. Flexible conduit 40 and cylindrical portion 54 may be connected and secured with the associated tile 42 in place on T-bars 44 by access through an opening adjacent such tile in which the ceiling tile has not yet been installed. Female - male connections 130 and 132 are connected at this time.

A modified outlet 52 is shown in FIG. 9 wherein cylindrical portion 54 of outlet 52 includes a threaded section 140 to which backing plate 142 is in threaded association, enabling the outlet 52 to be preassembled to selected ceiling tiles 42, the tiles sandwiched between escutcheon plate 56 and backing plate 142. Flexible tubing 40 can be secured to cylindrical portion 58 after this selected tile is in place and before other tiles 42 are installed. The simple male - female clip assembly 130, 132 referred to previously, is used with respect to wires from sensor 102 and LED 106 for connection with wires 114.

Figure 7:
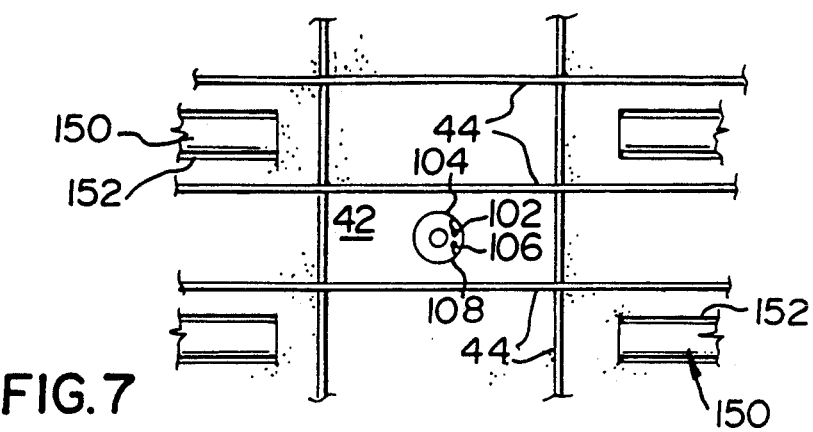
FIG. 7 shows a view of a ceiling outlet from below.
Figures 10, 11:
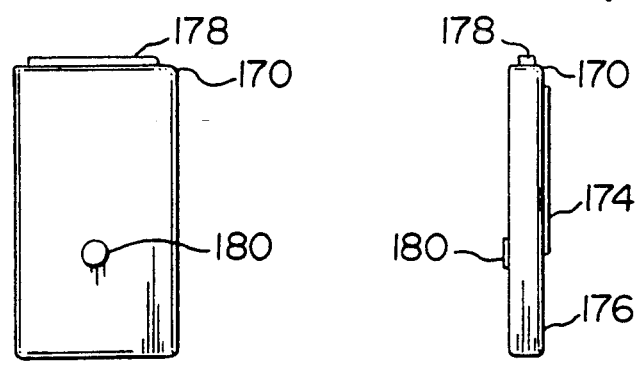
FIGS. 10 and 11 show front and side views of a control device.

Returning to FIG. 4, there is illustrated fitting 50, conduit 40 and outlet 52 in elevation along with ceiling tiles 42 and T-bars 44 and hangers 46. Also shown and shown in FIG. 7 are known fluorescent light units 150 which include lateral gaps 152 permitting air return to plenum 154 which is between tiles 42 and building floor 48, all of which is common in the art. As shown in FIG. 4, air exiting from outlet 52 is directed downwardly to work station 160 having a desk 162 and chair 164. Associated with work station 160 is hand held control 170 which is detachably secured to side 172 of desk 162. FIGS. 10 and 11 show an enlarged plan view and side view respectively of controller 170 with fastener means 174 on the back 176. Fastener means 174 and like means (not shown) on the desk side 172 may be of the hook and pile type such as that marketed under the trade mark VELCRO. The detachable association of hand held control 170 is exemplary and is not required. Other means of conveniently retaining control 170 at a work station location 160 may be used as will be appreciated by those skilled in the art. The desk and chair are also only exemplary of the work station, and other forms of equipment and furniture, such as drafting tables, within an area are possible and contemplated.

Control 170 has a battery operated infrared transmitter (not shown) through end 178 which transmitter is compatible with infrared sensor 102 in escutcheon plate 56. The transmitter within control 170 and sensor 102 are of known technology (such as used in some remote TV control systems) and further details of this technology is not believed necessary herein. Known ultrasonic transmitter/receiver technology is also useable in this system for control of the fitting valve 80.

LED 106 on escutcheon plate 56 is lighted when valve 80 is fully open and not lighted when valve 80 is closed. Button 180 on control 170 causes motor 92, through motor control relay 98, to cycle, whereby valve 80 will continue to move from closed to open to closed positions while depressed or actuated. LED 106 is not illuminated when valve 80 is fully closed even though a minimum passage of conditioned air is permitted to pass through conduit 40 and outlet 52 in view of the opening defined by the inner periphery of fitting end 68 and flat section 84 of valve 80. Release of button 180 stops motor 92 so that valve 80 assumes the position at the time of such release. LED 106 is lit indicating the valve is positioned to permit more than the minimum flow referred to above.

It will be appreciated that the perception of increased air flow may be all that is required for some people at work stations. However, others may prefer a more clear indication of the positioning of valve 80 such as ¼ open, ½ open, ¾ open and fully open. This may be accomplished by additional differently colored LEDS in escutcheon plate 56, one for each position and wired into the motor control or relay 98 through additional wires 114, the motor control sending out the appropriate signal to indicate the positioning of the valve.

An even more sophisticated system for indicating valve position may be provided if escutcheon plate 56 is provided with a receiver-transmitter and control 170 also has a receiver. In this case, a meter or dial may be provided on control 170 showing the position of the valve 80. Further, it will be appreciated that transmitter-receiver technology is such that a thermostat control can be incorporated into control 170 thereby controlling the flow of conditioned air to the zone (and the temperature associated therewith) when the thermostat is set on the control 170.

It will still further be appreciated that control 170 and/or receiver 102 may incorporate means providing an audio signal to indicate valve position for visibly impaired occupants.

In using the system, fittings 50 would be manufactured and assembled as a unit including valve 80, motor 92 and motor control or relay 98 and shipped to the site. Flexible tube 40 would likewise be fabricated off site to a specified length with wires 114 running between insulation 118 and the tubing forming conduit 40, the wires extending from each end thereof. The wires would even have appropriate clips thereon for site connection to the wires of the outlet LED 1 receiver. If necessary, conduit 40 may be cut to a shorter length on site prior to installation with wires 114 being left at the longer length if clips were preassembled to the wires.

Once fitting 50 is mounted on a trunk duct 32, end 70 of conduit 40 is secured by clamp 73 to fitting end 68 and the other or free conduit end 122 located in the ceiling plenum 154 for connection to the outlet 52. A tile 42 preassembled with escutcheon assembly as shown in FIG. 9, is located within the appropriate T-bars 44 and free end 122 of conduit 40 is connected via clamp 53 to outlet portion 54. Clip connection of wires 114 to wires 126 of LED 106 and sensor 102 completes the installation.

Although blower unit 12 provides predetermined flow of conditioned air through ring main 20, branch duct 34 and trunk duct 32, an individual at a particular location may adjust the flow of air into his/her particular area. More particularly, due to the flat section 84 on valve 80, there is always some conditioned air from the blower unit 12 exiting from outlet 52. However, if the individual wishes to increase that flow of air in order to provide the perception of cooler conditions through increased air flow, he/she may further open valve 80 by aiming the infrared transmitter of controller 170 towards sensor 102, pushing button 180 and through motor control relay 98 motor 92 is caused to open valve 80. If less air flow is desired, further pushing button 180 will cause motor 92 to cycle to fully open and then back towards a closed position.

In the preferred embodiment, the fitting 50 is of aluminum and the outlet 52 of plastic material. Conduit 40 is of flexible metal, insulated with known insulation. It will be appreciated that fitting 50 may itself be covered with insulation material although such is not shown in the drawings. An exemplary fitting 50 has a flange 60 of about 1 inch width with cone 66 reducing from about a 6" internal diameter at flange 60 to about 2 inches internal diameter at end 68, the cone portion 60 and end portion 68 both being about 4 inches in length. Cylindrical portion 56 is also about 2 inch internal diameter and so is flexible conduit 40.

Figure 12:
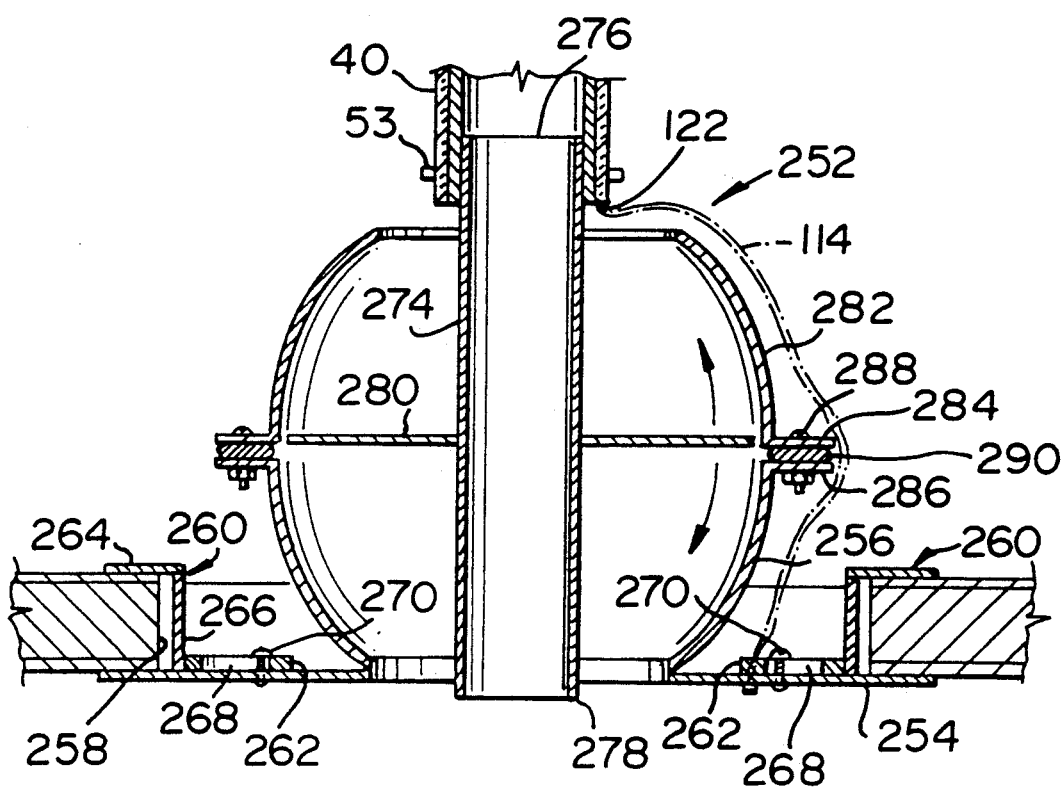
FIG. 12 shows a sectional view of a modified outlet and escutcheon plate assembly.

Shown in FIG. 12 is a variation in the ceiling/wall outlet and is designated 252. Outlet 252 has generally squarish appearance plate 254 to which is integrally secured semi-spherical housing portion 256. Plate 254 is secured against tiles 42 about aperture 258 by clips 260, a suitable number being spaced circumferentially in association with aperture 258 and plate 254 to be able to secure plate to tile 42. Each clip 260 is generally Z-shaped and includes lower leg 262 and upper leg 264 joined by intermediate portion 266. Lower leg 262 has elongated aperture 268 through which screws 270 extend, the elongated apertures 268 permitting clips 260 to slide from an inward to an outward position in securing plate 254 in place. Cylindrical tube 274 has end 276 for connection with end 122 of conduit 40 through clamp 53 and has outlet end 278. Tube 274 is integrally mounted to circular plate 280. Semi-spherical restraint housing 282 has peripheral flange 284 for bolting to peripheral flange 286 of semi-spherical housing 256 by peripherally spaced bolts 288 and circular seal 290.

The diameter of plate 280 is substantially the same as the internal diameter of the generally spherical assembly of housing 256 and restraint 282 so that there is a slight friction fit. The fit is such that the angular orientation of the tube 274 relative to the plane of appearance plate 254 may be altered to direct air flow at an angle rather than vertically downward. This arrangement provides for increased flexibility of directing the air flow at a particular work station if, after installation of the duct system, some movement of furniture or the like is desired. Tube 274 is not intended to be moved frequently and therefore is moved by a stick (ruler) or the like inserted into end 278. An obvious alternative would be to move tube 274 by hand by standing on a chair or ladder as is often done in changing light bulbs.

Variations in the system are possible as will be appreciated. Although appropriate official clearance would be required, a remote electronic FM transmitter/receiver system could be used to control valve 80. The receiver could be mounted by brackets on fitting 50 with the antennae helically wrapped about cone section 66. This embodiment would require selected FM frequencies coded into each control unit so that a control unit would operate a signal only for the fitting valve for which it is designed.

The embodiments of the invention in which an exclusive property or privilege is claimed are defined as follows:

1. In an air conditioning system, means for controlling the flow of conditioned air from a duct to a predetermined location of an occupied area of a building comprising:

fitting means secured at one end thereof to said duct and having a moveable butterfly valve mounted therein for selectively controlling flow of conditioned air therethrough, and fitting means including motor means and motor control means for controlling operation of said valve;

outlet means mounted in association with wall means adjacent said location and spaced from said fitting;

flexible conduit means connected to another end of said fitting means and extending from said fitting means to and connected with said outlet means;

remote signal receiving means in electrical circuit with said motor means and motor control means and located to receive a transmitted signal;

remote controlled signal transmitter means signal compatible with said receiving means whereby an occupant in said location may remotely control through actuation of said transmitter means, the position of said valve in said fitting and thus control the flow of conditioned air through said outlet to said location; and said flexible conduit means including insulation means covering wires for said electrical circuit between said receiving means and said motor control means, said wires being preassembled with said flexible conduit means under said insulation.

2. In an air conditioning system, means for controlling the flow of conditioned air from a duct to a predetermined location of an occupied area of a building comprising:

fitting means secured at one end thereof to said duct and having a moveable butterfly valve mounted therein for selectively controlling flow of conditioned air therethrough, said fitting means including motor means and motor control means for controlling operation of said valve;

outlet means mounted in association with wall means adjacent said location and spaced from said fitting;

flexible conduit means connected to another end of said fitting means and extending from said fitting means to and connected with said outlet means;

remote signal receiving means in electrical circuit with said motor means and motor control means and located to receive a transmitted signal;

remote controlled signal transmitter means signal compatible with said receiving means whereby an occupant in said location may remotely control through actuation of said transmitter means, the position of said valve in said fitting and thus control the flow of conditioned air through said outlet to said location;

signal receiving means being mounted in association with said outlet means and said outlet means including means mounted thereon in electrical circuit with said motor control means which visibly indicates a position of said valve to the occupant in said location; and said outlet means comprising an escutcheon plate facing said location, an aperture through said plate and a hollow cylindrical tube associated with said aperture to which said flexible conduit is secured, said signal receiving means and valve position indicating means being mounted in said escutcheon plate.

3. The system of claim 2 wherein said cylindrical tube includes exterior thread means and said outlet includes a backing plate for threaded association with said tube thread means whereby said outlet means may be preassembled to a ceiling tile associated with said location.

4. In an air conditioning system, means for controlling the flow of conditioned air from a duct to a predetermined location of an occupied area of a building comprising:

fitting means secured at one end thereof to said duct and having a moveable butterfly valve mounted therein for selectively controlling flow of conditioned air therethrough, said fitting means including motor means and motor control means for controlling operation of said valve;

outlet means mounted in association with wall means adjacent said location and spaced from said fitting;

flexible conduit means connected to another end of said fitting means and extending from said fitting means to and connected with said outlet means;

remote signal receiving means in electrical circuit with said motor means and motor control means and located to receive a transmitted signal;

remote controlled signal transmitter means signal compatible with said receiving means whereby an occupant in said location may remotely control through actuation of said transmitter means, the position of said valve in said fitting and thus control the flow of conditioned air through said outlet to said location;

said outlet means including means mounted therein in electrical circuit with said motor control means which provides an indication of the position of said valve to the occupant in said location; and said outlet means comprising an appearance plate about an aperture and a hollow cylindrical tube mounted for limited angular movement relative said appearance plate, said outlet means including clip means for mounting said plate to an aperture ceiling tile associated with said location whereby the appearance plate faces the location.

5. In a method of air conditioning a work area on a floor wherein there is a duct system for conveying conditioned air to said floor and a fitting secured to said duct having a motor controlled valve, the fitting being in air flow communication through a flexible conduit to an outlet spaced from said fitting and associated with a wall or ceiling adjacent said work area, the steps of:

providing signal receiving means mounted in electrical circuit with control means for said motor controlled valve, said receiving means being mounted to said outlet and being in an electrical circuit with said motor control means through wires closely adjacent said flexible conduit;

providing signal transmitter means remote from said outlet and in said work area;

providing indicating means on the outlet which is in the electrical circuit with said signal receiving means and said motor control means for indicating the position of said valve;

selectively activating said transmitter to send a signal compatible with said receiver to control the position of said valve in said fitting and the flow of air through the outlet to said work area.

6. In an air conditioning system, means for controlling the flow of conditioned air from a duct to a predetermined location of an occupied area of a building comprising:

fitting means secured at one end thereof to said duct and having a moveable butterfly valve mounted therein for selectively controlling flow of conditioned air therethrough, said fitting means including motor means and motor control means for controlling operation of said valve;

outlet means mounted in association with an opening in a false ceiling above said location and spaced from said fitting, said outlet means including nozzle means within said outlet means and mounted for limited pivotable movement relative to said opening;

flexible conduit means connected to another end of said fitting means and extending from said fitting means to and connected with said nozzle means;

remote signal receiving means in electrical circuit with said motor means and motor control means and located adjacent said nozzle means, said motor means being responsive to a signal transmitted from said signal receiving means;

remote controlled signal transmitter means signal compatible with said receiving means whereby the position of said valve in said fitting and the flow of conditioned air through said nozzle means to said location may be remotely controlled by an occupant in said location through actuation of said transmitter means; and means mounted adjacent said ceiling opening and in electrical circuit with said motor control means which provides information indicative of the position of said valve to the occupant in said location.

* * * * *